(12) United States Patent
Ward et al.

(10) Patent No.: US 6,257,749 B1
(45) Date of Patent: Jul. 10, 2001

(54) VEHICLE LAMP HOUSING HAVING MULTIPLE MOUNTING MEANS, AND METHOD OF USING SAME

(75) Inventors: Adam M. Ward, Marysville; Dennis F. Jacobs, Columbus; James T. Wyatt, Delaware, all of OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/310,249

(22) Filed: May 12, 1999

(51) Int. Cl.$^7$ ............................................. F21V 7/04
(52) U.S. Cl. ........................ 362/549; 362/368; 362/487
(58) Field of Search ................................ 362/364, 368, 362/546, 549, 506, 507, 538, 544, 457, 487

(56) References Cited

U.S. PATENT DOCUMENTS

| | | | |
|---|---|---|---|
| 4,532,578 | * 7/1985 | Gaden et al. | 362/368 |
| 4,636,921 | * 1/1987 | Vollrath | 362/549 |
| 5,154,505 | * 10/1992 | Sasamoto | 362/368 |
| 5,660,456 | 8/1997 | Shinkai et al. | |

* cited by examiner

*Primary Examiner*—Y. Quach
(74) *Attorney, Agent, or Firm*—Carrier, Blackman & Associates, P.C.; William D. Blackman; Joseph P. Carrier

(57) ABSTRACT

A plastic lamp housing for attaching to a vehicle is provided with auxiliary mounting structure to allow reattachment to a vehicle, subsequent to minor breakage of a primary mounting structure provided integrally therewith. The lamp housing includes a housing body for supportively receiving at least one bulb therein and a projecting portion, integrally provided with the housing body, for use in connecting the lamp housing to a vehicle. The projecting portion extends outwardly from a surface of the housing body and may have a groove formed therein proximate the first surface of the housing body to provide a breakaway point. The housing body further includes fastener receiving structure provided on and an auxiliary mounting bracket which may be readily secured to the fastener receiving structure, for use in reattaching the housing body to the vehicle, without affecting the structural integrity, functionality or exterior appearance of the housing body.

21 Claims, 2 Drawing Sheets

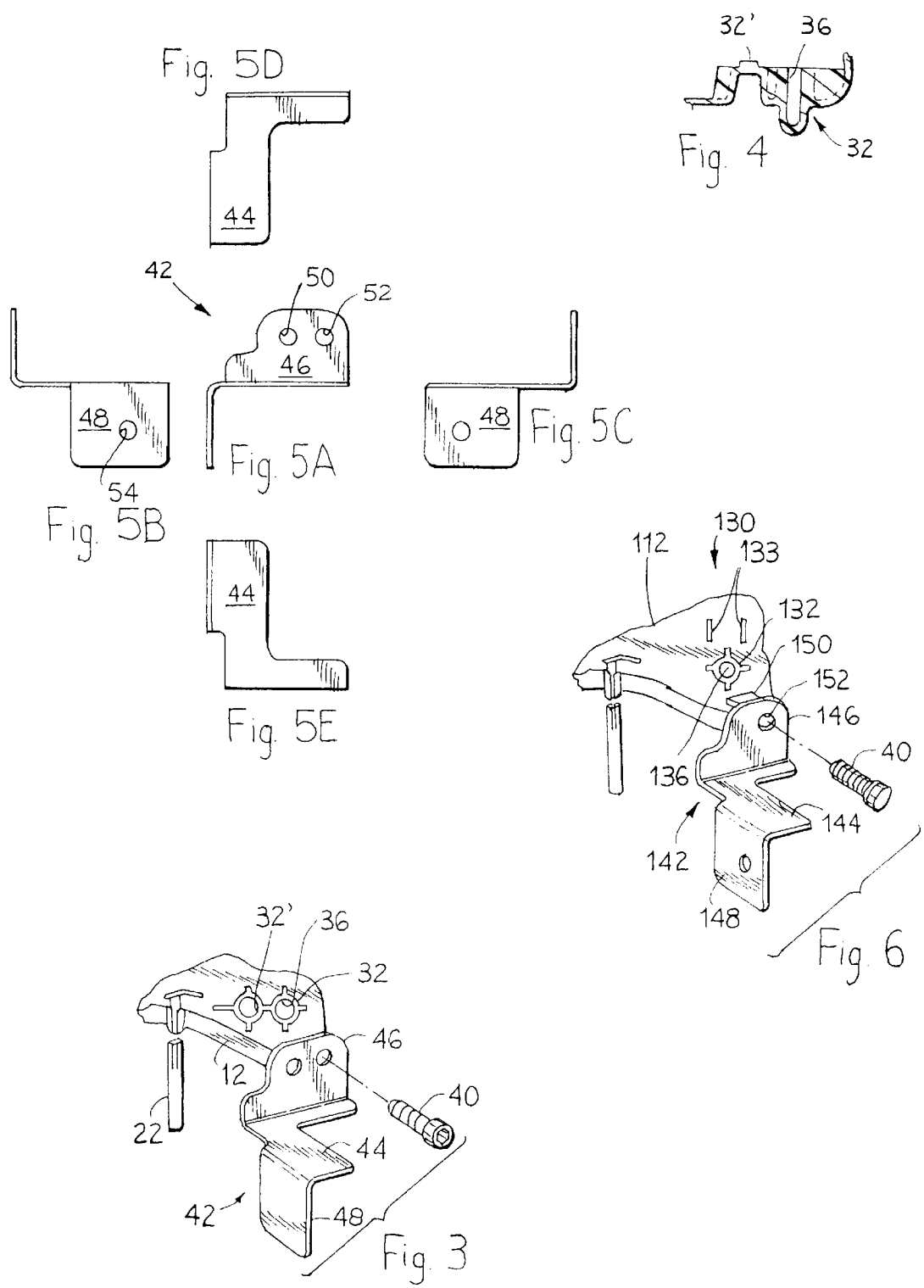

VEHICLE LAMP HOUSING HAVING MULTIPLE MOUNTING MEANS, AND METHOD OF USING SAME

BACKGROUND OF THE INVENTION

1. Field of the invention

The present invention relates to a vehicle lamp housing. More particularly, the present invention relates to a plastic vehicle lamp housing having a primary mounting means with an integrally formed breakaway bracket incorporated therein, as well as a backup or supplemental mounting means incorporated therein, and to a method of using the housing.

2. Description of the Background Art

In the automotive industry, there has been, of late, a movement away from the use of relatively large, standardized sealed beam headlamps of a few limited shapes, such as round and rectangular. Instead, much smaller illuminating bulbs are being used, in combination with relatively large, custom-molded, one-piece housing units which are unique to a particular vehicle line, and which each house a plurality of illuminating bulbs. Such combinations advantageously permit the headlamp assemblies, and other lamps assemblies on the vehicle to play a larger role in vehicle styling, especially in an aerodynamic sense, because these custom housing units can be produced with great flexibility in size, shape, appearance, exterior surface contours, and the like, as compared to the old sealed headlamps.

Generally, these new lamp housing assemblies tend to be significantly larger and significantly more expensive than the old sealed headlamps. For purposes of cost reduction, the housing units tend to be molded of plastic, and include outwardly extending, integrally formed mounting brackets or posts or feet for retentively attaching the housing to the vehicle body.

One illustrative example of a combination lamp housing using this type of outwardly extending mounting member is disclosed in U.S. Pat. No. 5,660,456 to Shinkai et al. In the design of Shinkai et al., a plastic post or pin formed integrally with the lamp housing is used to secure the housing to a vehicle body by pressing the pin in place into a concave fastener in the vehicle body. A novel aspect of Shinkai's invention is that a plurality of upstanding reinforcement ribs are arranged radially around the base of the pin such that the pin extends indirectly from the housing through the ribs, for thereby avoiding undesirable shrinkage phenomena. Bolt insertion holes are also provided along an upper peripheral edge of the housing in this design.

Unfortunately the large, one-piece housing bodies tend to be a basis for significant repair expense. Specifically, if the outwardly extending integral mounting brackets, posts, etc. of the lamp housing are broken or snapped off in a collision or otherwise, the entire housing will generally have to be replaced even if the rest of the housing body is otherwise undamaged and the externally visible portions thereof appear normal. This is because it is not possible to reattach the broken mounting brackets or to attach replacement mounting brackets to the housing units through welding, mechanical fasteners, etc., without detrimentally affecting the integrity and/or outward appearance of the housing units. Moreover, the integral mounting brackets and other mounting portions tend to be broken even in low or moderate speed collisions, again requiring significant replacement expense. As will be understood, this is not only very expensive, but unnecessarily consumes significant resources generating the large replacement housing bodies, and adds to landfill problems in disposing of the replaced, damaged units.

From the foregoing, it will also be understood that there is a significant need in the art for a simple, low-cost alternative to replacing a molded plastic lamp housing in the event that an outwardly extending mounting portion thereof is damaged or snapped off, but the housing is otherwise undamaged.

SUMMARY OF THE INVENTION

According to the present invention there is provided lamp housing for a vehicle, comprising a housing body for supportively receiving at least one bulb therein, primary mounting means comprising at least one projecting portion for being connected to a vehicle body, the projecting portion being integrally formed with said housing body and extending outwardly therefrom, and wherein said housing body further comprises supplemental mounting means formed integrally therewith for allowing said housing body to be reattached to the vehicle body subsequent to structural failure of said primary mounting means.

Preferably, the projecting portion has a weakened area formed in a base thereof, proximate the housing body, such that the projecting portion is adapted to break along the weakened area in the event that a sufficiently large force is applied to the housing body without affecting the structural integrity or exterior appearance of the housing body; while the supplemental mounting means preferably includes fastener receiving means, such as boss(es) projecting from a surface of the housing body near the primary mounting means and adapted to securely receive a fastener, again, without affecting the structural integrity and exterior appearance of the housing body.

The present invention also encompasses a lamp housing kit, including the lamp housing as describe above, an auxiliary mounting bracket and fastening means for attaching the auxiliary mounting bracket to the housing at the supplemental mounting means. Preferably, the auxiliary mounting bracket includes a projecting end shaped similarly to the projecting portion of the lamp housing, and the overall shape of the auxiliary bracket is such that when the bracket is fastened to the supplemental mounting means the projecting end of the bracket is disposed in substantially the same location as the projecting portion of the primary mounting means prior to the projecting portion being broken off.

The present invention also provides a method of reattaching a lamp housing to a vehicle body. A method in accordance with the invention includes a first step of providing a housing body with an integral fastener receiving means on a surface of the lamp housing near the primary mounting means, a second step of attaching an auxiliary bracket to a fastener receiving means on the lamp housing, the auxiliary bracket having a connecting portion for being connected to a vehicle body, and a third step of connecting the connecting portion of the auxiliary bracket to the vehicle body with fastening means.

It is an object of the present invention to provide a lamp housing for a vehicle which integrally includes means to allow for ready reattachment thereof to a vehicle body after a primary attachment means for the housing has been broken, but where the housing is otherwise undamaged.

It is another object of the invention to provide such a lamp housing in which reattachment can be readily achieved without detrimentally affecting the integrity, functionality or exterior appearance of the housing.

It is yet another object of the invention to provide such a lamp housing in which the reattachment means is very simple and low cost, both in terms of manufacturing and use of same.

It is still another object of the invention to provide such a lamp housing in which the primary mounting means is constructed to break away from the housing in the event of a collision or the like without affecting the integrity, functionality or exterior appearance of the housing.

For a more complete understanding of the present invention, including other objects, advantages and salient features thereof, the reader is referred to the following detailed description of the preferred embodiment thereof, which should be read in conjunction with the accompanying drawings. Throughout the following detailed description and in the drawings, like numbers refer to like parts.

BRIEF DESCRIPTION OF THE DRAWINGS

FIG. 3 is a perspective view, of an auxiliary mounting bracket in accordance with the present invention, also showing a fastener and a portion of the lamp housing of FIG. 2 to which the auxiliary mounting bracket is to be attached;

FIG. 4 is a broken away cross-sectional view of a mounting boss containing a fastener receiving recess portion of the lamp housing of FIG. 1; and FIGS. 5A–5E are several views of the auxiliary mounting bracket of FIG. 3, in which FIG. 5A is a front elevational view thereof;

FIG. 5B is a first side view thereof;

FIG. 5C is a second side view thereof, taken on a side opposite that shown in FIG. 5B;

FIG. 5D is a top plan view thereof;

FIG. 5E is a bottom plan view thereof; and

FIG. 6 is a perspective view of a second embodiment of the invention similar to FIG. 3.

DETAILED DESCRIPTION OF THE PRESENTLY PREFERRED EMBODIMENTS

Figure 1:
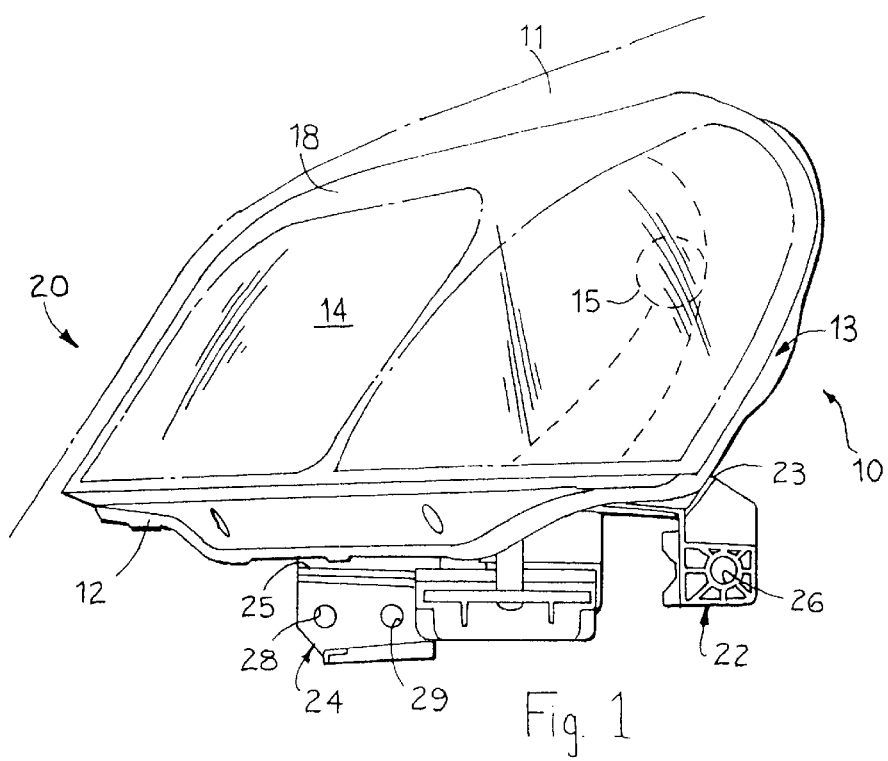
FIG. 1 is a side plan view of a lamp housing assembly in accordance with a preferred embodiment of the present invention, with a portion of a vehicle body shown in phantom.
Figure 2:
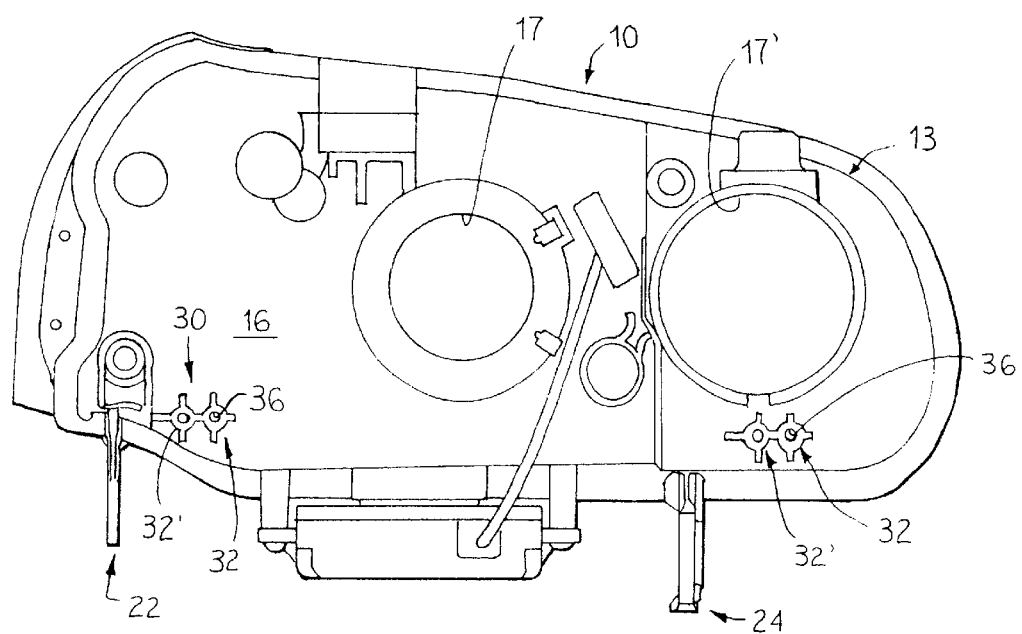
FIG. 2 is a rear elevational view of the lamp housing of FIG. 1.

Referring now to FIGS. 1–4 of the drawings, a lamp housing assembly, in accordance with a preferred embodiment of the present invention, is shown generally at 10. The lamp housing assembly 10 is provided with auxiliary mounting structure, to be further described hereinbelow, to allow reattachment of the housing assembly to a vehicle body 11, subsequent to minor breakage of a primary mounting structure, where the integrity, functionality and externally observable portions of the assembly otherwise remain intact.

The assembly 10 includes a lamp housing 13, including a housing body 12 and a pair of integral projecting portions 22, 24 provided therewith, and a translucent cover plate 14 which is glued, screwed on, or otherwise affixed to the housing body. As used throughout the specification and in the claims, the term 'translucent' is intended to encompass both clear or transparent, and tinted or translucent in the normal sense.

The housing body 12 is provided for supportively receiving at least one bulb unit 15 therein, that are received in a sealed manner in openings 17, 17' in a rear surface 16 of the housing body, and the body, including the portions 22, 24 is preferably molded as a single piece of an appropriate stiff, strong opaque plastic material. The housing body 12 depicted in the drawings has the first, or rear surface 16 for placement facing the vehicle body 11, and a second, or front surface 18, substantially opposite the first surface 16, for facing outwardly on the vehicle 20. As is conventional with lamp housings of this type, selected portions of the front surface 18 of the housing body 12, in the area(s) intended to receive the bulb unit(s) 15, are coated with a reflective material to aid in channeling, directing, and distributing light therefrom.

The lamp housing assembly 10 is, again, provided with one or more integral, projecting portions 22, 24, extending from the housing body 12, for use in connecting the assembly to a vehicle body 11. Two projecting portions 22, 24 are shown in the depicted embodiment, and they constitute the primary mounting structure or means for the assembly 10. In the embodiment shown in FIGS. 1–2, the projecting portions 22, 24 are provided with mounting holes 26, 28, 29, respectively, to receive mounting hardware such as screws or bolts (not shown) therethrough. Alternatively, as an equivalent structure, the projecting portions could be made in other forms, such as pins (not shown) which could be slid through a mounting hole (not shown) in the vehicle body 11 and could slidably receive fastening hardware thereon. The projecting portions 22, 24 are integrally formed with the housing body 12, and in the depicted embodiment extend outwardly and downwardly from the rear surface 16 thereof. It is preferred that each of the projecting portions 22, 24 have a weakened area, such as a notch or groove 23, 25, respectively, formed in a base section thereof, proximate the rear surface 16 of the housing body 12, to provide a breakaway point thereon. This is desirable because the projecting portions are thus adapted to cleanly break away from the housing body 12 in the event that a sufficiently large, but not excessively large, force is applied to the body 12, such as in a low or moderate speed collision. By thus cleanly breaking away from the body 12, the projecting portions 22, 24 will not detrimentally affect the structural integrity, functionality and exterior appearance of the remaining bulk of the body 12, such as would be the case if a portion of the body surrounding the portions 22 or 24 were to crack upon breaking of the portions 22, 24. Also, by thus cleanly breaking away from the body 12, the projecting portions will not interfere with attachment of an auxiliary mounting bracket 42, discussed further below.

The housing body 12 further preferably includes a supplemental mounting structure 30 (FIGS. 2–4) molded as part of the first or rear surface 16 thereof near each of the projecting portions. As shown, the supplemental mounting structure according to the first preferred embodiment preferably includes at least one mounting boss 32 operatively associated with the rear surface 16, and most preferably a mounting boss 32 in combination with an alignment pin 32', both integrally molded with the housing body 12. As shown (see especially FIG. 4), the mounting boss 32 preferably extends into the housing body 12 at a location where it is not observable from the exterior of the vehicle, and the alignment pin 32' preferably projects from the rear surface 16 of the housing body 12, and as such, the members 32, 32' are spaced apart from the front surface 18 thereof, which is desirable to avoid any detrimental effect on the integrity, function and exterior appearance of the front surface. The mounting boss 32 is preferably adapted to receive a threaded fastener or other fastener therein, and preferably includes a fastener receiving recess or hollow portion like that shown at 36 formed therein, as best shown in FIG. 4. The boss 32 preferably has the recess 36 formed through a central section thereof, and most preferably the boss is closed at the innermost end of the recess 36 such that dirt and other foreign matter cannot enter the housing body 12 through the recess. A threaded fastener 40, preferably of the self-tapping variety, may be engagingly received in the fastener receiving recess 36 by simply screwing the fastener 40 into the boss at the recess. Also, the depth of the boss 32 and the recess 36 therein are preferably greater than the threaded portion of the fastener 40 so that the fastener never engages or punctures the innermost surface of the boss 32 when attached thereto, and so that the integrity of the body 12 is not affected by the fastener 40.

As shown it is preferred that the boss 32 and alignment pin 32' are provided such that the mounting bracket 42, discussed below, is secured to the housing body 12 at two points, with the fastener 40 received in the boss and the fastener and the alignment pin 32' extending through a pair of openings 52, 50 defined in the bracket 42, so that the fastened bracket cannot pivot or otherwise easily move relative to the housing body 12. Any such engagement could impair the structural integrity, functionality and/or exterior appearance of the body 12.

The lamp housing assembly 10 is also preferably provided or associated with one or more of the auxiliary mounting brackets such as that shown at 42 in FIGS. 3 and 5A–5E, for using with threaded fasteners 40 and the supplemental mounting structure 30 for reattaching the housing body 12 to the vehicle body 11. The auxiliary mounting bracket 42 is preferred to be made of sheet metal, such as galvanized steel, but could be formed of any other appropriate material such as molded plastic, cast metal, etc. In the depicted embodiment, the auxiliary mounting bracket 42 includes a flat L-shaped central portion 44 with an upstanding flange 46 and a dependent flange 48 integrally formed therewith. The upstanding flange 46 is provided with the pair of holes 50, 52 formed therethrough which are respectively alignable with the alignment pin 32' and the fastener receiving recess 36 in the mounting boss 32 disposed adjacent to each other on the body 12, so that the bracket can be securely attached to the body 12 with the pin 32' and the fastener 40 extending respectively through the holes 50, 52 as shown in FIG. 3. Similarly, the dependent flange 48 is provided with a hole 54 formed therethrough to receive another fastener (not shown) therethrough for thereby connecting the bracket 42 to a suitable portion of the vehicle body 11. The dependent flange 48 provides a connecting portion of the mounting bracket which effectively replaces the projecting portion 22 or 24, at such time as the projecting portion may become snapped off at the groove 23. The overall shape of the bracket 42 is preferable such that once the auxiliary mounting upstanding flange 46 has been attached to the housing body 12 at the boss 32 and the alignment pin 32' adjacent thereto, the connecting portion provided by the dependent flange 48 is disposed in substantially the same location and orientation on the assembly 10 as that which the projecting portion 22 or 24 occupied before breakage thereof. This greatly facilitates reattachment of the housing body 12 to the vehicle body 11.

The provision of the auxiliary mounting bracket 42 along with the integrally formed supplemental mounting structure 30 allows for the original equipment lamp housing assembly 10 to be easily reused and reattached to the vehicle 20, subsequent to a minor traffic altercation or the like which has only damaged the projecting portions 22 and/or 24 integrally provided with the housing body 12. This desirably saves the vehicle owner money, as well as preserving resources which would otherwise be used to manufacture a replacement lamp housing and to dispose of the slightly damaged housing.

As will be understood, the bracket 42 need not be suitably shaped to replace each of the projecting portions 22, 24, but other suitably shaped sheet metal auxiliary mounting brackets (not shown), which may for example be shaped as a mirror image of the bracket 42, could be provided for replacement of the other projecting portion in the same manner as described above.

Referring to FIG. 6, there are shown portions of a lamp housing assembly according to a second preferred embodiment of the present invention, and particularly to a supplemental mounting structure 130 molded integrally with a lamp housing body 112 and a mounting bracket 142 which may be selectively fixed to the housing body 112 at the mounting structure 130. Other portions of the lamp housing assembly according to the second preferred embodiment are the same as in the first preferred embodiment and are not discussed again.

The mounting bracket 142 is structurally and functionally similar to the mounting bracket 42 of the first preferred embodiment except that only one opening 152 is provided in an upstanding flange 146 of the bracket for receiving a fastener 40 therethrough, while a projecting tab 150 is provided to extend perpendicularly away from the upper edge of the flange in a direction opposite to the central portion 144 of the bracket. Likewise, the supplemental mounting structure 130 (as provided on the housing body 112) is structurally and functionally similar to the mounting structure 30 (as provided on the housing body 12 in the first preferred embodiment), except that the structure 130 includes a pair of spaced tabs or stoppers 133 disposed above a boss 132, rather than a boss 32 and an alignment pin 32' disposed side by side as in the first embodiment. In use, the bracket 142 is secured to the housing body 112 using a fastener 40 which is inserted through the bracket opening 152 and screwed into a recess 136 in the boss 132, in the same manner as the first embodiment. When the bracket 142 is thus secured, the tab 150 on the bracket is disposed between the stoppers 133, such that the stoppers operatively prevent the tab 150, and hence the bracket 142, from pivoting or rotating relative to the boss 132 and the housing body 112, very similarly to the alignment pin 32' and the opening 50 in the first embodiment. The tab 150 and stoppers 133 function as an alignment means, in essentially the same manner as the alignment pin 32' and the opening 50 in the first embodiment.

Again, it will be understood that modifications may be made in the structure of the second preferred embodiment, while still achieving essentially the same result. For example, instead of having the pair of stoppers 133 provided on the housing body, another boss with a central recess could be provided above the boss 132 and the tab 150 could be received in the recess of the other boss. Also, the tab 150 could be provided to extend from one of the side edges of the flange 146, rather than from the upper edge thereof.

Lamp Housing Assembly Kit

The housing body 12 or 112, one or more of the mounting bracket(s) 42 or 142 and/or a variety of different ones of the brackets may be sold together as a kit for installation on a particular vehicle. Such a kit may further contain a plurality of fasteners 40.

Optionally, the mounting bracket(s) 42, 142 may be fastened to the rear surface of the housing body 12 or 112, in an out-of-the-way location thereon, during original assembly of the vehicle, so that it is available to an auto body repair person at a later time, if the assembly needs reattaching to the vehicle body 11. If this approach is used, an appropriate slot (not shown) could, optionally, be formed in the rear surface of the housing body 12 or 112, in order to accommodate a flange of the bracket such as, e.g., the upstanding flange 46 or 146, in order to more easily mount the bracket 42 or 142 to the housing body for storage purposes.

Method of Use

The present invention also includes a method of reattaching a lamp housing assembly 10 to a vehicle body. A method in accordance with the invention includes a first step of providing a supplemental mounting structure 30 (or 130) integrally formed with a surface of the housing body 12 (or 112) near the primary mounting means 22 or 24, attaching an auxiliary mounting bracket 42 (or 142) to the fastener receiving means using a fastener 40, the auxiliary bracket having a dependent flange 48 (or 148) for connecting to a vehicle body 11, and connecting the dependent flange 48 (or 148) to the vehicle body.

In carrying out the method hereof, the lamp housing assembly used is substantially the lamp housing assembly 10 according to the invention, modified by having the projecting portion 22 thereof broken off adjacent the first, or rear surface 16 of the housing body 12 (or 112).

Although the present invention has been described herein with respect to the preferred embodiments thereof, the foregoing description is intended to be illustrative, and not restrictive. Those skilled in the art will realize that many modifications of the preferred embodiments could be made without departing from the spirit or essence of the invention. For example, instead of using a boss 32 and an adjacent alignment pin 32' as the supplemental mounting structure, a pair of the bosses 32 could be used together with two of the fasteners 40. All such modifications which are within the scope of the claims are intended to be within the scope and spirit of the present invention.

What we claim is:

1. A lamp housing for a vehicle, comprising:
   a housing body for supportively receiving at least one bulb therein;
   primary mounting means operatively attached to said housing body and comprising at least one portion projecting from said housing body for being connected to a vehicle body; and
   wherein said housing body further comprises supplemental mounting means formed integrally therewith for allowing said housing body to be reattached to the vehicle body subsequent to structural failure of said primary mounting means;
   and further wherein each of said primary and supplemental mounting means is adapted to be fixedly attachable to the vehicle, to allow mounting of said housing body thereon.

2. The lamp housing of claim 1, wherein said projecting portion is formed with a weakened area in a base section thereof.

3. The lamp housing of claim 2, wherein said projecting portion is adapted to break along said weakened area when sufficient force is applied to the housing body.

4. The lamp housing of claim 1, wherein said housing body, said projecting portion and said supplemental mounting means are molded as a single plastic member.

5. The lamp housing of claim 1, wherein each of said primary and supplemental mounting means comprises structure for cooperatively engaging the fastener, to selectively and independently allow fixed attachment of said housing body to the vehicle body by either of said mounting means.

6. A lamp housing for a vehicle, comprising:
   a housing body for supportively receiving at least one bulb therein;
   primary mounting means operatively attached to said housing body and comprising at least one portion projecting from said housing body for being connected to a vehicle body; and
   wherein said housing body further comprises supplemental mounting means formed integrally therewith for allowing said housing body to be reattached to the vehicle body subsequent to structural failure of said primary mounting means;
   and further wherein said supplemental mounting means comprises fastener receiving means formed with a surface of said housing body.

7. The lamp housing of claim 6, wherein said fastener receiving means includes at least one boss formed with the surface of said housing body and adapted to securely receive a fastener therein.

8. The lamp housing of claim 7, wherein said boss has a recessed portion shaped to receive a threaded fastener therein.

9. The lamp housing of claim 6, wherein said supplemental mounting means further comprises at least one alignment member formed with said surface of said housing body near said fastener receiving means.

10. The lamp housing of claim 6, and an auxiliary mounting bracket adapted to be attached to said housing body at said supplemental mounting means.

11. The lamp housing of claim 10, wherein said auxiliary mounting bracket is shaped such that a projecting end thereof is disposed in a location substantially corresponding to that of the projection portion of said housing body when the auxiliary mounting bracket is attached to the supplemental mounting means.

12. The lamp housing of claim 10, further comprising a fastener adapted to connect said auxiliary mounting bracket to said supplemental mounting means.

13. A vehicular lamp housing assembly comprising:
   a housing body;
   a mounting member formed integrally with the housing body and projecting therefrom for being connected to a vehicle body;
   fastener receiving means formed integrally with the housing body near said mounting member; and
   and auxiliary mounting bracket adapted to be connected to said fastener receiving means as a replacement for said mounting member.

14. The lamp housing assembly according to claim 13, further including fastening means for fastening the auxiliary mounting bracket to said fastener receiving means.

15. The lamp housing assembly of claim 14, wherein said fastener receiving means includes at least one boss provided with a surface of said housing body and adapted to securely receive a fastener therein.

16. The lamp housing assembly of claim 15, wherein said boss has a recessed portion shaped to receive a threaded fastener therein.

17. The lamp housing assembly according to claim 13, further including an alignment member provided with said housing body near said fastener receiving means for aligning said mounting bracket when the mounting bracket is connected to said fastener receiving means.

18. The lamp housing assembly according to claim 17, wherein said alignment member operatively cooperates with said auxiliary mounting bracket to prevent said bracket from pivoting relative to said housing body when the mounting bracket connected to the fastener receiving means.

19. The lamp housing assembly of claim 13, wherein said auxiliary mounting bracket has a base portion connectable to said fastener receiving means, and a projecting end connectable to the vehicle body.

20. The lamp housing assembly of claim 19, wherein said auxiliary mounting bracket is shaped such that said projecting end is disposed in a location substantially corresponding to that of the mounting member of said housing body when the auxiliary mounting bracket is fastened to the fastener receiving means.

21. The lamp housing assembly of claim 13, wherein said mounting member is formed with a weakened area in a base section of the mounting bracket along which the mounting member is adapted to break when sufficient force is applied to the housing body.

* * * * *